(12) United States Patent
Tsurumaki (10) Patent No.: US 11,639,072 B2
(45) Date of Patent: May 2, 2023

(54) SHEET MEMBER AND PRODUCTION METHOD OF SHEET MEMBER

(71) Applicant: Takahiko Tsurumaki, Gosen (JP)

(72) Inventor: Takahiko Tsurumaki, Gosen (JP)

( * ) Notice: Subject to any disclaimer, the term of this patent is extended or adjusted under 35 U.S.C. 154(b) by 365 days.

(21) Appl. No.: 16/633,554

(22) PCT Filed: Jul. 25, 2017

(86) PCT No.: PCT/JP2017/026919
§ 371 (c)(1),
(2) Date: Jan. 23, 2020

(87) PCT Pub. No.: WO2019/021377
PCT Pub. Date: Jan. 31, 2019

(65) Prior Publication Data
US 2020/0391532 A1 Dec. 17, 2020

(51) Int. Cl.
| | |
|---|---|
| *B41M 3/06* | (2006.01) |
| *G09F 13/20* | (2006.01) |
| *B41M 3/00* | (2006.01) |
| *B44F 1/08* | (2006.01) |

(52) U.S. Cl.
CPC .............. *B41M 3/06* (2013.01); *B41M 3/008* (2013.01); *B44F 1/08* (2013.01); *G09F 13/20* (2013.01); *Y10T 428/24802* (2015.01)

(58) Field of Classification Search
CPC ........................................................ G09F 13/20
See application file for complete search history.

(56) References Cited

U.S. PATENT DOCUMENTS

| | | |
|---|---|---|
| 5,811,174 A | 9/1998 | Murakami |
| 2008/0305310 A1 | 12/2008 | Hausserman et al. |

FOREIGN PATENT DOCUMENTS

| | | | |
|---|---|---|---|
| JP | H08207194 A | | 8/1996 |
| JP | H10247065 A | | 9/1998 |
| JP | H10287851 A | | 10/1998 |
| JP | H1159285 A | | 3/1999 |
| JP | 200043224 A | | 2/2000 |
| JP | 2000356950 A | * | 12/2000 |
| JP | 2000356950 A | | 12/2000 |

(Continued)

OTHER PUBLICATIONS

International Search Report (Translation of Form PCT/ISA/210) for International Application No. PCT/JP2017/026919, dated Oct. 31, 2017, 4 pages.

(Continued)

*Primary Examiner* — Ian A Rummel
(74) *Attorney, Agent, or Firm* — Withrow & Terranova, P.L.L.C.; Vincent K. Gustafson (57) ABSTRACT

Provided is a sheet member including a sheet-shaped substrate with a transmissive property including a first surface and a second surface, a colored layer, and a phosphorescent layer containing a phosphorescent material. In the sheet member, the colored layer and the phosphorescent layer are arranged adjacent to at least the first surface. Further, the sheet member includes, at least partially, at least either one of a part where the colored layer is arranged more adjacent to the substrate than the phosphorescent layer, or a part where the colored layer is arranged on the substrate and the phosphorescent layer is not arranged.

6 Claims, 5 Drawing Sheets

(56) References Cited

FOREIGN PATENT DOCUMENTS

| JP | 3523946 B | 4/2004 |
|----|-----------|--------|
| JP | 2004167889 A | 6/2004 |
| JP | 2008233178 A | 10/2008 |
| JP | 2013254143 A | 12/2013 |
| JP | 3201516 U | 12/2015 |
| JP | 2016170399 A | 9/2016 |
| KR | 1020090002568 A | 1/2009 |

OTHER PUBLICATIONS

International Preliminary Report on Patentability (Translation of Form PCT/IB/373) for International Application No. PCT/JP2017/026919, dated Feb. 6, 2020, 16 pages.
Notice of Reasons for Refusal for Japanese Patent Application No. 2019-532256, dated Mar. 16, 2021, 10 pages.
Notice of Reasons for Refusal for Japanese Patent Application No. 2019-532256, dated Oct. 12, 2021, 10 pages.
Notice of the First Patent Examination Opinion for Chinese Patent Application No. 201780093558.0, dated Jun. 3, 2021, 20 pages.
Second Office Action for Chinese Patent Application No. 201780093558.0, dated Jan. 17, 2022, 13 pages including English translation.
Notice of Reasons for Rejection for Chinese Patent Application No. 201780093558.0, dated Aug. 4, 2022, 13 pages.

\* cited by examiner

SHEET MEMBER AND PRODUCTION METHOD OF SHEET MEMBER

CROSS-REFERENCE TO RELATED APPLICATION(S)

This application is the U.S. national phase under 35 U.S.C. § 371 of International Application No. PCT/JP2017/026919 filed on Jul. 25, 2017, wherein the entire contents of the foregoing application are hereby incorporated by reference herein.

TECHNICAL FIELD

The present disclosure relates to a sheet member including a phosphorescent material.

BACKGROUND ART

Conventionally, a printing technology has been proposed in which an ink including a phosphorescent material is used as shown in Patent Document 1.

PRIOR ART DOCUMENTS

Patent Documents

Patent Document 1: Japanese Unexamined Patent Application Publication No. 2004-167889

SUMMARY OF THE INVENTION

Problems to be Solved by the Invention

A phosphorescent material itself has a color. For example, strontium aluminate is white in color. Thus, when printing is performed on a sheet or the like using an ink containing not only the phosphorescent material, but also a pigment and/or a dye, a printed part of the sheet or the like becomes cloudy in color due to the phosphorescent material.

In one aspect of the present disclosure, it is desirable to provide a sheet member less influenced by color of a phosphorescent material.

Means for Solving the Problems

One aspect of the present disclosure is a sheet member that comprises: a sheet-shaped substrate with a transmissive property comprising a first surface and a second surface; a colored layer; and a phosphorescent layer containing a phosphorescent material. The colored layer and the phosphorescent layer are arranged adjacent to at least the first surface. The sheet member comprises, at least partially, at least either one of a part where the colored layer is arranged more adjacent to the substrate than the phosphorescent layer, or a part where the colored layer is arranged on the substrate and the phosphorescent layer is not arranged.

In the sheet member configured as above, when a viewer of the sheet member views the sheet member from a side of the above-described second surface, at least part of the colored layer is visible through the substrate without being covered with the phosphorescent layer. Thus, in this sheet member, an influence of the color of the phosphorescent material can be reduced, thereby enabling a color of the colored layer to be sufficiently visible.

The above-described sheet member may be configured such that the second surface of the substrate is used as a front side.

Another aspect of the present disclosure is a sheet member that comprises: a sheet-shaped substrate comprising a first surface and a second surface; a colored layer; and a phosphorescent layer containing a phosphorescent material. The colored layer and the phosphorescent layer are arranged adjacent to at least the first surface. The sheet member comprises, at least partially, at least either one of a part where the phosphorescent layer is arranged more adjacent to the substrate than the colored layer, or a part where the colored layer is arranged on the substrate and the phosphorescent layer is not arranged.

In the sheet member configured as above, when a viewer of the sheet member views the sheet member from a side opposite to the second surface, at least part of the colored layer is visible without being covered with the phosphorescent layer. Thus, in this sheet member, an influence of the color of the phosphorescent material can be reduced, thereby enabling a color of the color layer to be sufficiently visible.

The sheet member of the above-described another aspect may be configured such that the second surface of the substrate is used as a backside.

Further, each of the above-described sheet members may at least comprise: at least one first area where a first colored layer is provided; and at least one second area comprising at least either one of an area where the colored layer is not provided or an area where a second colored layer more transmissive to light than the first colored layer is provided. At least either one of the at least one first area or the at least one second area may be plurally arranged in a distributed manner. The phosphorescent layer may be arranged in at least part of the at least one second area.

Owing to this configuration, at least part of light emitted from the phosphorescent layer becomes visible from outside through the second area where the light is easily transmitted. Consequently, brightness of an emitted light of the sheet member can be improved, and efficient arrangement of the phosphorescent layer results in reduction in a used amount of the phosphorescent material, thereby realizing cost reduction.

Another aspect of the present disclosure is a production method of a sheet member, the method comprising: a process of forming a colored layer, by printing, on a surface of a sheet-shaped substrate with a transmissive property; and a process of forming a phosphorescent layer containing a phosphorescent material, by printing, on a surface of the colored layer.

Further, another aspect of the present disclosure is a production method of a sheet member, the method comprising: a process of forming a phosphorescent layer containing a phosphorescent material, by printing, on a surface of a sheet-shaped substrate; and a process of forming a colored layer, by printing, on a surface of the phosphorescent layer.

With these production methods, a sheet member less influenced by the color of the phosphorescent material can be produced by printing.

EXPLANATION OF REFERENCE NUMERALS

11 . . . substrate, 11a . . . first surface, 12 . . . colored layer, 13 . . . phosphorescent layer, 101, 102, 103, 104, 105, 107, 108, and 109 . . . sheet members, 101a, 102a, 103a, 104a, 107a, 108a, and 109a . . . front sides, 107b, 108b, and 109b . . . back sides, 201 . . . ink, 202 . . . ink, 211 . . . pressure roller, 212 . . . plate, 213 . . . doctor blade

MODE FOR CARRYING OUT THE INVENTION

Embodiments of the present disclosure will be described hereinafter with reference to the accompanying drawings. It is to be understood that each embodiment described below is merely one form of the present disclosure, and that the present disclosure is not limited to the embodiments, but may be implemented in various forms within the technical scope of the present disclosure. Sheet members disclosed in the drawings are schematic, and shape or thickness of any sheet member is not limited to that shown in the drawings.

1. Configuration of Sheet Member

Figure 1:
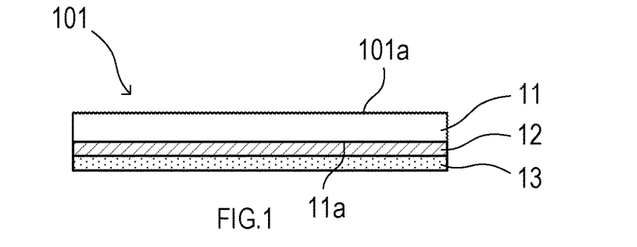
FIG. 1 is a side sectional view showing one example of a sheet member.

FIG. 1 shows one example of a sheet member 101 of the present disclosure. The sheet member 101 shown in FIG. 1 comprises a substrate 11, a colored layer 12, and a phosphorescent layer 13. The sheet member may be in a form of, for example, paper, cloth, or a plastic film, having a small thickness and a large area.

<Substrate>

The substrate 11 is a sheet-shaped member. The substrate 11 may have a light transmissive property or may have no light transmissive property. If the colored layer 12 and the phosphorescent layer 13 are to be visually perceived through the substrate 11 itself by a person viewing the sheet member 101, the substrate 11 may be a member with a transmissive property. For example, the substrate 11 may have such a degree of transmissivity that allows light emitted from a below-described phosphorescent material to be visible through the substrate 11.

For materials of the substrate 11, for example, transparent or translucent thin plate-shaped resin or glass may be employed. Specifically, examples of the materials of the substrate 11 may include polypropylene, polyethylene, polyester, nylon, vinyl chloride, polycarbonate, polyvinyl alcohol, acrylic, cellophane, polystyrene, and Japanese paper. If the colored layer 12 and the phosphorescent layer 13 are to be visually perceived not through the substrate 11, the material, composition, and the like of the substrate 11 are not limited in particular.

<Colored Layer>

The colored layer 12 includes a pigment, a dye, and/or the like exhibiting colors such as red and blue, and is a layer configured such that these colors are visible from outside. The colored layer 12 can be formed, for example, using a general printing ink. Further, a colored film or the like may be used as the colored layer 12.

The colored layer 12 may be configured so as to have a light transmissive property. Owing to this configuration, a viewer of the sheet member can visually perceive a light of the phosphorescent layer 13 viewed through the colored layer 12, even when, for example, the colored layer 12 and phosphorescent layer 13 are layered.

<Phosphorescent Layer>

The phosphorescent layer 13 comprises the phosphorescent material and a retaining material to retain the phosphorescent material.

The phosphorescent material is a material that stores a light, such as visible light or UV light, and electromagnetic waves, and has a light emitting property. For example, the phosphorescent material obtained by adding materials such as cerium, europium, neodymium, and dysprosium for changing a light emitting state to strontium aluminate (such as $SrAl_2O_4$) as a main material may be used. However, the phosphorescent material is not limited to these.

The retaining material is a material that retains the phosphorescent material, and has a light transmissive property to allow the phosphorescent material to accumulate light and to emit light. Examples of the retaining material may include gloss varnish, matt varnish, abrasion-resistive varnish, anti-static varnish, anti-blocking varnish, drying oil, paints, and adhesives.

2. Specific Arrangement of Phosphorescent Layer and Colored Layer

The colored layer and the phosphorescent layer may be arranged on the same surface of the substrate. The surface on which the colored layer and the phosphorescent layer are arranged is hereinafter described as a first surface. Further, a surface opposite the first surface of the substrate is hereinafter described as a second surface. Although the second surface may be a surface on which the colored layer and the phosphorescent layer of the present disclosure need not necessarily be formed, the second surface may be also provided with either the colored layer or the phosphorescent layer.

The arrangement of the colored layer and the phosphorescent layer may be different depending on whether the second surface of the substrate is a front side or a back side of the sheet member as a whole. Each of such different cases will be described below. It is to be noted that the front side and the back side are defined in relation with effects and functions resulting from the arrangement, merely for the sake of explanatory convenience, and are not terms for explaining a use state of the sheet member. In other words, there is no limitation in using the front side as a back side in practice.

[2-1. Cases in which Second Surface is Front Side of Sheet Member]

If the second surface is the front side of the sheet member, the colored layer and the phosphorescent layer can be viewed well through the substrate.

The sheet member includes, at least partially, at least either one of a part where the colored layer is arranged on the substrate side relative to the phosphorescent layer or a part where the colored layer is arranged on the substrate and the phosphorescent layer is not arranged. In other words, at least part of the colored layer 12 is arranged such that the phosphorescent layer is not present between the colored layer and the substrate. Specific examples are described below.

In the sheet member 101 in FIG. 1, the colored layer 12 is formed on a first surface 11a of the substrate 11, and further the phosphorescent layer 13 is formed in such a manner as to cover the colored layer 12. A surface opposite the first surface 11a is to be a front side 101a of the sheet member 101. That is, the second surface of the substrate 11 is the front side 101a.

In the above-described sheet member 101, the colored layer 12 is positioned in front of the phosphorescent layer 13 as viewed from a side of the front side 101a, thereby reducing an influence of a color of the phosphorescent material itself contained in the phosphorescent layer 13 on a color of the colored layer 12. Further, the light of the phosphorescent layer 13 is visible from the side of the front side 101a through the colored layer 12.

Figure 2:
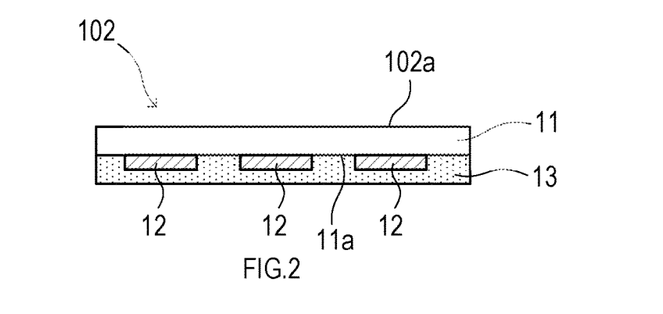
FIG. 2 is a side sectional view showing one example of a sheet member.

In a sheet member 102 in FIG. 2, two or more colored layers 12 are formed on the first surface 11a of the substrate 11 in a distributed manner. In addition, the phosphorescent layer 13 is formed in such a manner as to cover these colored layers 12, and further in a part where the colored layers 12 are not formed.

"Distributed" as used herein may be a state in which the colored layers 12 as elements for forming a specified shape and color are discretely separated. Specifically, it corresponds to a case in which, for example, a square shape, as an example of the specific shape, is formed by a group of the distributed colored layers 12 each having a small area. The colored layers 12 may be sized such that a viewer can visually distinguish such a discretely separated state with ease or such that such distinction is difficult.

In the above-described sheet member 102, the color of the colored layers 12 is visible from a side of the front side 102a successfully, as well as part of the phosphorescent layer 13 is visible through the substrate 11 without being covered with the colored layers 12. Thus, the light from the phosphorescent layer 13 can be visually perceived more brightly.

When the sheet member 102 is viewed from above, namely, from the side of the front side 102a, that is, from a viewpoint where the sheet member 102 can be recognized as a planar surface, an area where the colored layers 12 are provided corresponds to a first area, and an area where the colored layers 12 are not provided corresponds to a second area.

The first area is an area where a first colored layer is provided in the sheet member. The second area is at least either one of an area where the first colored layer is not provided in the sheet member, or an area where a second colored layer more transmissive to light than the first colored layer is provided. In case of not considering the phosphorescent layer 13, the light from the phosphorescent layer 13 penetrates with a higher degree of transmissivity in the second area than in the first area. Each of the first colored layer and the second colored layer is not particularly limited to a specific color as long as they are different from each other in a light transmissive property.

Figure 3:
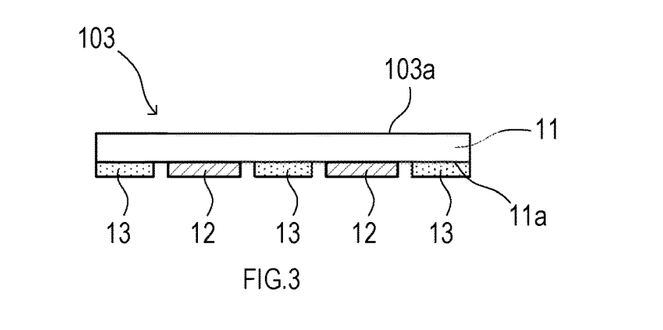
FIG. 3 is a side sectional view showing one example of a sheet member.

In a sheet member 103 in FIG. 3, two or more colored layers 12 are formed on the first surface 11a of the substrate 11 in a distributed manner, and further, two or more phosphorescent layers 13 are formed so as not to overlap the colored layers 12 in a thickness direction.

In the above-described sheet member 103, the color of the colored layers 12 is not impaired, as well as the light from the phosphorescent layers 13 can be visually perceived effectively from a side of the front side 103a without being obstructed by the colored layers 12.

The colored layers 12 and the phosphorescent layers 13 may partly overlap each other in the thickness direction. In this case, the color stands out if the colored layers 12 are arranged on the front side 103a, and a brightness stands out if the phosphorescent layers 13 are arranged on the front side 103a.

Figure 4:
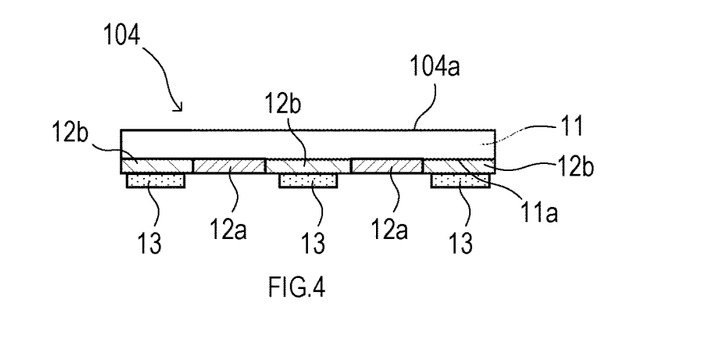
FIG. 4 is a side sectional view showing one example of a sheet member.

In a sheet member 104 in FIG. 4, two kinds of colored layers 12a and 12b having different color depths are formed on the first surface 11a of the substrate 11, and further the phosphorescent layers 13 are formed on the colored layers 12b. Compared with the colored layers 12a, the colored layers 12b are relatively pale and more transmissive to light.

In the above-described sheet member 104, the phosphorescent layers 13 are arranged in an area where the colored layers 12b more transmissive to light are present, so that the light from the phosphorescent layers 13 can be visually perceived effectively from a side of a front side 104a. The colored layers 12a may be different from the colored layers 12b in color as long as they differ in the light transmissive property.

In the sheet member 104, an area where the colored layers 12a are provided corresponds to the first area, and the area where the colored layers 12b are provided corresponds to the second area. In case of not considering the phosphorescent layers 13, the light penetrates with a higher degree of transmissivity in the second area than in the first area.

Next, configurations of the sheet members will be described with reference to the plan views of FIG. 5 and FIG. 6.

Figure 5:
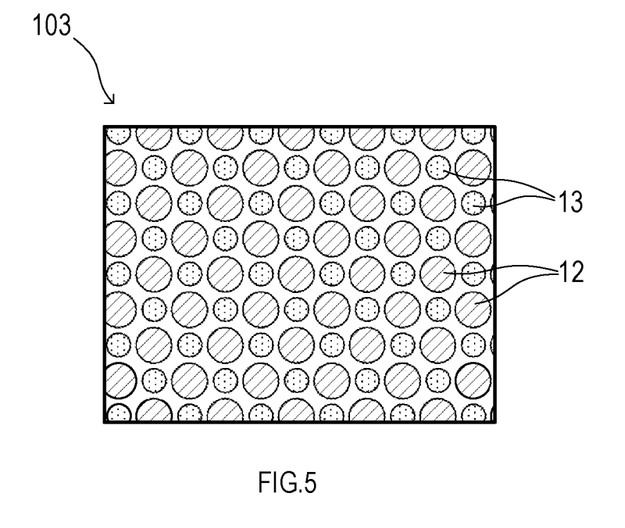
FIG. 5 is a plan view showing one example of a sheet member.
Figure 6:
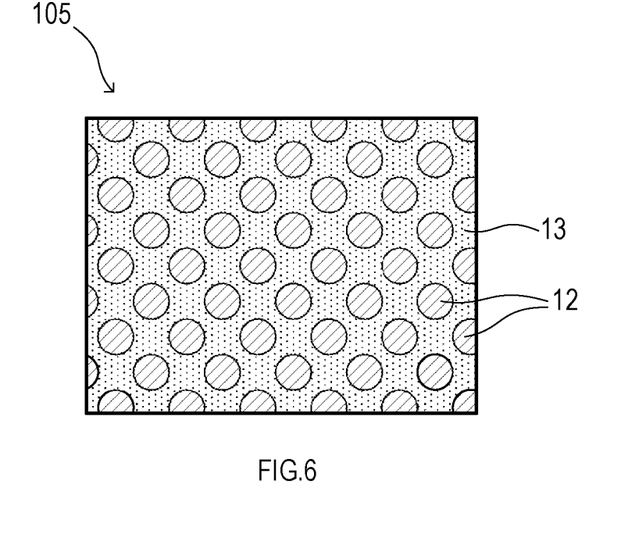
FIG. 6 is a plan view showing one example of a sheet member.

The sheet member 103 in FIG. 5 is one example of the arrangement of the colored layers 12 and the phosphorescent layers 13 not overlapping each other, as shown by the sheet member 103 in FIG. 3. The phosphorescent layers 13 may be arranged between the colored layers 12 without any space therebetween, as shown by a sheet member 105 in FIG. 6.

The colored layers 12 and the phosphorescent layers 13 may partly overlap each other. Further, the colored layers 12 need not necessarily be arranged in a position closer to the front side of the sheet member than the phosphorescent layers 13 throughout the sheet member, and in part of the colored layers 12, the phosphorescent layers 13 may be arranged in a position closer to the front side of the sheet member than the colored layers 12.

[2-2. Cases in which Second Surface is Back Side of Sheet Member]

If the second surface is the back side of the sheet member, the colored layer and the phosphorescent layer are visible, not through the substrate, from the front surface side of the sheet member. Thus, the substrate need not necessarily be a member with a transmissive property.

The sheet member includes, at least partially, at least either one of a part where the phosphorescent layer is arranged on the substrate side relative to the colored layer, or a part where the colored layer is arranged on the substrate and the phosphorescent layer is not arranged. In other words, at least part of the colored layer is arranged such that the phosphorescent layer is not present on a side opposite to a side where the substrate is positioned, with respect to the colored layer.

Figure 7:
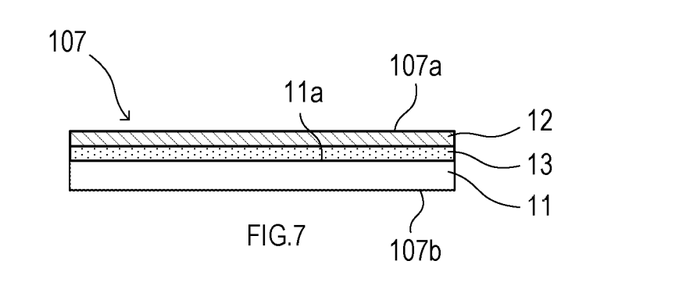
FIG. 7 is a side sectional view showing one example of a sheet member.

In a sheet member 107 in FIG. 7, the phosphorescent layer 13 is formed on the first surface 11a of the substrate 11, and further the colored layer 12 is formed on the phosphorescent layer 13. The first surface 11a of the substrate 11 and a front side 107a of the sheet member 107 are present on the same side with respect to the substrate 11.

A second surface different from the first surface 11a of the substrate 11 is a back side 107b as a back surface of the sheet member 107.

In the above-described sheet member 107, the colored layer 12 is positioned in front of the phosphorescent layer 13 as viewed from a side of the front side 107a, thereby reducing an influence of a color of the phosphorescent material itself contained in the phosphorescent layer 13 on a color of the colored layer 12. Further, the light of the phosphorescent layer 13 is also visible from the side of the front side 107a through the colored layer 12.

Figure 8:
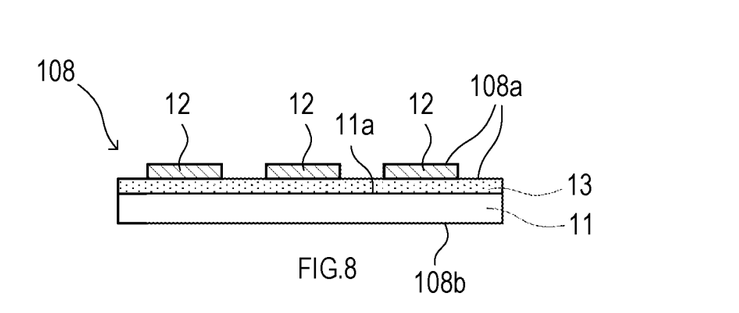
FIG. 8 is a side sectional view showing one example of a sheet member.

In a sheet member 108 in FIG. 8, the phosphorescent layer 13 is formed on the first surface 11a of the substrate 11, and the colored layers 12 are formed on the phosphorescent layer 13 in a distributed manner.

In the above-described sheet member 108, the color of the colored layers 12 is visible from a side of the front side 108a successfully, as well as part of the phosphorescent layer 13 is visible through the substrate 11 without being covered with the colored layer 12. Thus, the light from the phosphorescent layer 13 can be visually perceived more brightly. The second surface of the substrate 11 is a back side 108b as a back surface of the sheet member 108.

Figure 9:
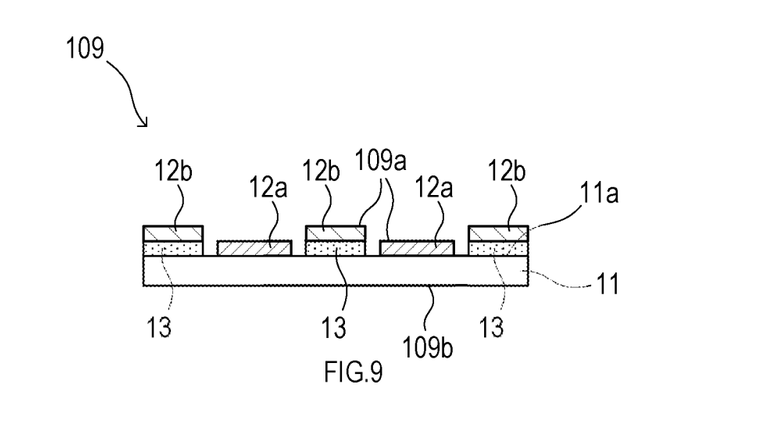
FIG. 9 is aside sectional view showing one example of a sheet member.

A sheet member 109 in FIG. 9 will be described. In the sheet member 109, two or more phosphorescent layers 13 are formed on the first surface 11a of the substrate 11 in a distributed manner. Further, in the sheet member 109, two or more colored layers 12a each having a relatively deep color are formed in an area where the phosphorescent layers 13 are not present. Also, in the sheet member 109, two or more colored layers 12b having a relatively light color and a relatively high transmissive property are formed on the phosphorescent layers 13.

In the above-described sheet member 109, the phosphorescent layers 13 are arranged in an area where the colored layers 12b more transmissive to light are present, so that the light from the phosphorescent layers 13 can be visually perceived from a side of a front side 109a effectively. The colored layers 12a and the colored layers 12b may be different from each other in color as long as they differ in the light transmissive property. The second surface of the substrate 11 is a back side 109b as a back surface of the sheet member 109.

The area where the colored layers 12a are provided corresponds to the first area. The area where the colored layers 12b are provided corresponds to the second area.

The configurations of the sheet member, which are shown in FIG. 1 to FIG. 9, described above are only examples, and the sheet member may have various configurations other than those described above. The example embodiments of the sheet member may be used in combination in one sheet member. The sheet member may be configured such that the front and back sides of the sheet member 103 in FIG. 3 are reversed. The sheet member having the second surface as a back side also may be configured such that at least either one of the colored layer 12 or the phosphorescent layer 13 is distributed, as shown by the sheet members in FIG. 5 and FIG. 6.

3. Production of Sheet Member

There is no particular limitation to a specific production method of the sheet member, and for example, a method appropriately corresponding to a specific configuration of the phosphorescent layer 13 and the colored layer 12 may be employed.

If the colored layer 12 is configured by an ink layer, for example, the colored layer 12 can be formed on the substrate 11 by printing.

The phosphorescent layer 13 can be formed by applying or printing a retaining material containing the phosphorescent material onto the substrate 11. Alternatively, a film constituting the phosphorescent layer 13 may be prepared, and the film may be overlapped with the substrate 11.

If the colored layer 12 and the phosphorescent layer 13 are formed on the substrate 11 by printing, they can be printed by various methods using an ink containing the phosphorescent material. Specific examples of the printing methods may include a gravure printing, a silk-screen printing, a pad printing, an offset printing, and an ink-jet printing. Performing the gravure printing is convenient because the sheet member can be produced in one production process.

Figure 10:
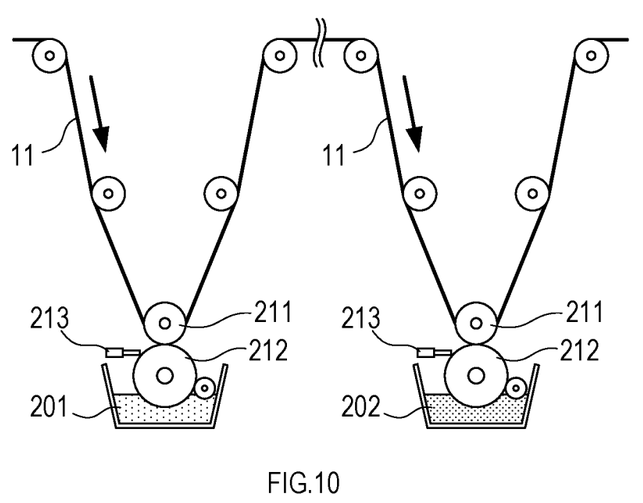
FIG. 10 is a view illustrating a production method of a sheet member by gravure printing.

A case in which the above-described sheet member having the second surface as a front side is produced by a gravure printing will be explained. As shown in FIG. 10, firstly, the colored layer 12 is printed on the substrate 11 using an ink 201 for forming the colored layer 12. In the printing, a pressure roller 211, a plate 212, a doctor blade 213, and so on can be used. After this process is performed as many times as needed in accordance with the number of colors in the printing, the phosphorescent layer 13 can be printed on the substrate 11 using an ink 202 (such as a medium containing the phosphorescent material) for forming the phosphorescent layer 13.

As described above, the sheet member can be formed by performing a process of forming the colored layer, by printing, on one surface of the sheet-shaped substrate with a transmissive property and a process of forming the phosphorescent layer containing the phosphorescent material, by printing, on a surface of the formed colored layer.

The phosphorescent layer 13 may be or not may be layered on the colored layer 12.

Further, in case of the sheet member in which the above-described second surface is the back side of the sheet member, reversely to the above-described processes, firstly, the phosphorescent layer 13 is formed by printing using the ink 202. Then, the colored layer 12 can be printed using the ink for forming the colored layer 12.

As described above, the sheet member can be formed by performing a process of forming the phosphorescent layer containing the phosphorescent material, by printing, on one surface of the sheet-shaped substrate, and a process of forming the colored layer, by printing, on a surface of the formed phosphorescent layer.

The colored layer 12 may be or may not be layered on the phosphorescent layer 13.

4. Color Adjustment

Figure 11:
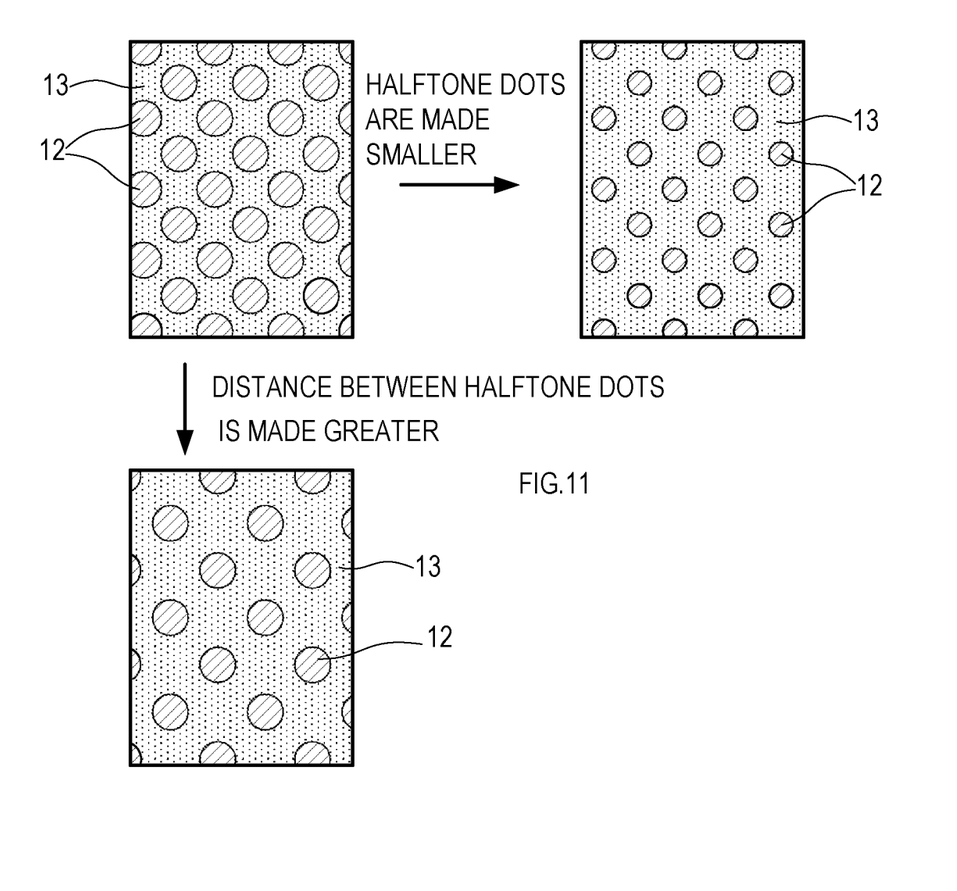
FIG. 11 is a plan view showing examples of formation of colored layers for a sheet member.

If an intensity of light from the phosphorescent layer 13 is desired to be increased, as shown in FIG. 11, halftone dots are made smaller by adjusting engraving of a plate for a gravure printing, thereby allowing the light to appear visibly intensive. Similarly, a distance between halftone dots is made greater, thereby also allowing the light to appear visibly intensive. In these cases, a visible color appears pale.

Alternatively, in color printing in the gravure printing, the printing is performed using its color ink with addition of a medium, thereby making the visible color of the colored layer 12 pale. Consequently, the light from the phosphorescent layer 13 can be made to appear visibly intensive.

Further, if it is desired to produce a sheet having a white turbidity, it can be reproduced by printing at least either one of the colored layer 12 or the phosphorescent layer 13 using an ink with the white turbidity. The phosphorescent layer 13 may be printed using a color pigment mixed into a phosphorescent ink for forming the phosphorescent layer 13.

5. Effects

According to the above detailed embodiments, the following effects can be obtained.

(5a) When the second surface as a surface opposite the first surface 11a of the substrate is to be the front side of the sheet member and the sheet member is viewed from a side of the front side, at least part of the colored layer is in a front position without being covered with the phosphorescent layer. Thus, in the aforementioned sheet member, an influence of the color of the phosphorescent material is reduced, thereby enabling the color of the colored layer to be sufficiently visible.

(5b) On the other hand, when the second surface is to be the back side of the sheet member and the sheet member is viewed from the side of the front side, similarly, at least part of the colored layer is in a front position without being covered with the phosphorescent layer. Thus, in the aforementioned sheet member, an influence of the color of the phosphorescent material is reduced, thereby enabling the color of the colored layer to be sufficiently visible.

(5c) The colored layer 12 and the phosphorescent layer 13 are formed by printing, whereby the sheet member of the present disclosure can be easily produced. Moreover, the sheet member can be produced at one printing operation by printing the colored layer 12 and the phosphorescent layer 13 by gravure printing.

(5d) The phosphorescent layer 13 is provided in the above-described second area, that is, in the area where the light transmission is unlikely to be obstructed by the colored layer 12, thereby allowing the light to appear bright. Further, the phosphorescent layer 13 is mainly provided in the second area, emission of the light to be reduced by the colored layer 12 can be decreased.

6. Other Embodiments

It is to be understood that although embodiments of the present discloser have been described above, the present disclosure is not limited to the embodiments, but may be implemented in various forms within the technical scope of the present disclosure.

(6a) The colored layer 12 may contain the phosphorescent material. In this case, the phosphorescent material contained in the colored layer 12 may be less than that contained in the phosphorescent layer 13. In a sheet member comprising such colored layer 12, compared with a case in which an amount of the phosphorescent material contained in the phosphorescent layer 13 equals to an amount of the phosphorescent material contained in the colored layer 12, the influence of the phosphorescent material on the color of the colored layer 12 is reduced. Further, effects of the light emitted from the phosphorescent material can be obtained in the colored layer 12.

(6b) Respective materials for forming the substrate 11, the colored layer 12, and the phosphorescent layer 13 are not limited to materials described in the aforementioned embodiments, and suitable adjustments such as addition of other materials may be performed. A layer and/or a substance, other than the above-described colored layer 12 and phosphorescent layer 13, may be arranged between the substrate 11, the colored layer 12, and the phosphorescent layer 13.

(6c) The aforementioned embodiments are examples of a configuration in which the phosphorescent layer 13 is not arranged in front of the colored layer 12. However, in part of the sheet member, the phosphorescent layer 13 may be arranged in front of the colored layer 12. Further, the smaller a ratio of the phosphorescent layer 13 being arranged in front of the colored layer 12 is, the more an influence of a color of the phosphorescent material on the color of the sheet member as a whole can be reduced.

The invention claimed is:

1. A sheet member comprising:
   a sheet-shaped substrate with a transmissive property comprising a first surface and a second surface;
   a first colored layer including first colored layer regions provided at at least one first area of the substrate;
   a second colored layer including second colored layer regions provided at at least one second area of the substrate, the second colored layer being more light-transmissive than the first colored layer; and
   a phosphorescent layer containing a phosphorescent material,
   wherein the first and second colored layers and the phosphorescent layer are arranged adjacent to at least the first surface, and
   wherein the first colored layer regions are arranged in gapless lateral contact with the phosphorescent layer, and the second color layer regions are arranged in gapless lateral contact with the phosphorescent layer.

2. The sheet member according to claim 1,
   wherein the sheet member is configured such that the second surface of the substrate is used as a front side.

3. The sheet member according to claim 1,
   wherein at least one of the at least one first area or the at least one second area is plurally arranged in a distributed manner.

4. A sheet member comprising:
   a sheet-shaped substrate comprising a first surface and a second surface;
   a first colored layer including first colored layer regions provided at at least one first area of the substrate;
   a second colored layer including second colored layer regions provided at at least one second area of the substrate, the second colored layer being more light-transmissive than the first colored layer; and
   a phosphorescent layer containing a phosphorescent material,
   wherein the first and second colored layers and the phosphorescent layer are arranged adjacent to at least the first surface, and
   wherein the first colored layer regions are arranged in gapless lateral contact with the phosphorescent layer, and the second color layer regions are arranged in gapless lateral contact with the phosphorescent layer.

5. The sheet member according to claim 4,
   wherein the sheet member is configured such that the second surface of the substrate is used as a back side.

6. The sheet member according to claim 4,
   wherein at least one of the at least one first area or the at least one second area is plurally arranged in a distributed manner.

* * * * *